United States Patent [19]

Nakamura et al.

[11] Patent Number: 5,759,251
[45] Date of Patent: Jun. 2, 1998

[54] TITANIUM DIOXIDE CERAMIC PAINT AND METHODS OF PRODUCING SAME

[75] Inventors: Mitsuru Nakamura; Kazuhiko Mori; Masanobu Tanaka; Yoshihiko Nishizawa, all of Tokyo, Japan

[73] Assignee: Nihon Parkerizing Co., Ltd., Tokyo, Japan

[21] Appl. No.: 863,629

[22] Filed: May 27, 1997

[30] Foreign Application Priority Data

May 24, 1996 [JP] Japan ................... 8-130090
Aug. 16, 1996 [JP] Japan ................... 8-216306

[51] Int. Cl.⁶ .................. C09D 1/00; C04B 7/345
[52] U.S. Cl. .................. 106/286.4; 106/287.19; 106/816
[58] Field of Search .................. 106/286.4, 287.19, 106/816

[56] References Cited

U.S. PATENT DOCUMENTS 5,403,513  4/1995  Sato et al. .................. 252/309

FOREIGN PATENT DOCUMENTS 4-83537   3/1992  Japan.
4-142372  5/1992  Japan .................. 106/286.4
6-293519  10/1994 Japan.
7-100378  4/1995  Japan.

*Primary Examiner*—David Brunsman
*Attorney, Agent, or Firm*—Cushman Darby & Cushman IP Group of Pillsbury Madison & Sutro LLP

[57] ABSTRACT

A hydrophilic, photocatalytic, transparent and adhesive aqueous $TiO_2$ ceramic paint comprises orthotitanic acid, $Ti^{4+}$ ions and/or peroxotitanic acid and crystalline $TiO_2$ colloidal particles with an average particle size of 0.001 to 0.2 μm, and is produced by applying (a) semipermeable membrane dialysis, (b) semipermeable membrane electrodialysis or (c) ion-exchange treatment to an aqueous Ti salt solution to thereby hydrolyze and convert at least a portion of the Ti salt to the orthotitanic acid and the $TiO_2$ colloidal particles and simultaneously to remove impurity ions from the aqueous solution, or by heating the Ti salt solution at 50° to 100° C. after or without mixing an alkali metal hydroxide or ammonia to the Ti salt solution, and then applying the treatment (a), (b) or (c) to the resultant solution, or by mixing an alkali metal hydroxide or ammonia to the heated Ti salt solution followed by collecting a resultant precipitate and dispersing the precipitate in water or an aqueous solution of a peroxide compound or complexing agent.

8 Claims, No Drawings

TITANIUM DIOXIDE CERAMIC PAINT AND METHODS OF PRODUCING SAME

BACKGROUND OF THE INVENTION

1. Field of the Invention

The present invention relates to a titanium dioxide ceramic paint suitable for coating glass, metal, ceramic and plastic materials, and methods of producing same.

More particularly, the present invention relates to a titanium dioxide ceramic paint useful for forming a paint coating having excellent hydrophilicity, photocatalytic activity and light-transmittance and methods of producing same.

2. Description of the Related Art

Various paints containing alkali metal silicates, phosphates, silica sol and/or metal oxides are known as ceramic paints having excellent heat resistance and abrasion resistance in comparison with conventional organic paints.

The conventional ceramic paints are similarly advantageous in the excellent heat resistance and abrasion resistance to the conventional inorganic paints. Currently, an attempt to impart various new functions to the ceramic paint coating is developed by using, as main components, various metal oxides.

Among the various metal oxides, it is known that titanium dioxide exhibits a high hydrophilicity similar to that of the conventional ceramic materials such as silicon dioxide. When the titanium dioxide ceramic paint is coated on fin surfaces of heat exchangers, the high hydrophilicity of the resultant coating contributes to reducing the bridging phenomenon of condensed water between the fins, preventing the scattering of the water drops and enhancing the heat exchange efficiency. Also, when the titanium dioxide ceramic paint is coated on a surface of a light-transmissible article, for example, a glass article, the resultant hydrophilic ceramic coating can prevent collection of moisture on the surface of the article and tarnishing and blurring of the surface.

Among various ceramic paints, titanium dioxide paints can form coating films having an excellent photocatalytic activity, and can exhibit a high oxidative activity under radiation with ultraviolet rays. Accordingly, it is known that when the titanium dioxide ceramic paint is coated on a surface of a metallic, glass, or ceramic article, the resultant paint coating exhibits enhanced utilizability for stain-proofing, promoting decomposition of bad odor-generating materials, purification of water, corrosion prevention, anti-microbiological treatment, prevention of alga propagation, and decomposition of substances difficult to decompose. Thus, several attempts have been made to provide titanium dioxide paints for forming a titanium dioxide coating on article surfaces and methods for producing the titanium dioxide paints.

As a method of forming a titanium dioxide paint coating, a sol-gel coating method in which a hydrolysis product of a titanium alkoxide is used as an essential component of the paint is well known. As an analogous method to the sol-gel method, Japanese Examined Patent Publication No. 4-83537 teaches to prepare the titanium dioxide paint by adding an amide or glycol compound to a titanium alkoxide. Also, Japanese Unexamined Patent Publication No. 7-100,378 discloses a method of preparing the titanium dioxide paint by adding an alcoholamine to a titanium alkoxide.

Further, Japanese Unexamined Patent Publication No. 6-293,519 discloses a paint coating method in which fine titanium dioxide particles crystal-grown by a water-heating treatment at a temperature of 100° C. or more are dispersed by using a dispersing agent and the resultant dispersion is coated, and another coating method in which a binder, for example, water glass, colloidal silica or fluorine resin is mixed with crystalline titanium dioxide particles, and the resultant mixture is coated.

The sol-gel method is disadvantageous in that (1) an acid used as a hydrolyzing agent and an amine or glycol used as an additive are usually retained in the resultant paint coating and thus the resultant paint coating should be baked at a high temperature to remove them (2) the resultant titanium dioxide paint coating contains a large amount of combustible organic solvent, and, (3) the starting materials are expensive.

Also, the above-mentioned titanium dioxide paint-coating method, in which the titanium dioxide crystals are grown at a temperature of 100° C. or more, is disadvantageous in that (1) the resultant coating has an unsatisfactory transparency and thus is not suitable to transparent articles, for example, glass articles, and (2) when applied to fins of heat exchangers, the titanium dioxide paint is fixed at a low fixing efficiency and the coated fins generate a specific odor peculiar to ceramic materials.

Further, the conventional titanium dioxide paint-coating method in which a resin is used as a binder for titanium dioxide particles is disadvantageous in that (1) although the resin is contributory to enhancing the coating property, adhesion and fixing efficiency of the resultant paint, the resultant paint coating has an insufficient durability to use because the resin is degradated by the photocatalytic action of the titanium dioxide, and (2) the addition of the resin causes the content of the titanium dioxide to decrease and thus the resultant paint coating exhibits unsatisfactory hydrophilicity and photocatalytic activity.

SUMMARY OF THE INVENTION

An object of the present invention is to provide a hydrophilic, photocatalytic and light-transmitting titanium dioxide ceramic paint substantially free from impurities harmful to the photocatalytic activity of titanium dioxide and organic materials, for example, alcohols, and capable of forming a ceramic paint coating exhibiting excellent hydrophilicity and photocatalytic activity, light-transmittance and adhesion, and a method of producing same.

The above-mentioned object can be attained by the aqueous titanium dioxide ceramic paint of the present invention for forming a paint coating having excellent hydrophilicity, photocatalytic activity and light transmittance, which comprises:

(A) at least one member selected from the group consisting of orthotitanic acid, titanium (IV) ions and peroxotitanic acid, and (B) crystalline titanium dioxide colloidal particles having an average particle size of 0.001 to 0.2 μm, the weight ratio, in terms of titanium, of the component (A) to the component (B) being from 1:0.1 to 1:200, and the ceramic paint being substantially free from impurity ions.

The above-mentioned aqueous titanium dioxide ceramic paint can be produce by the method (1) of the present invention which comprises subjecting an aqueous solution of a titanium salt to at least one treatment selected from the group consisting of:

(a) a dialysis treatment using a semipermeable membrane, (b) an electrodialysis treatment using a semipermeable membrane, and (c) an ion-exchange treatment using an ion-exchanger to thereby hydrolyze and convert at least a portion of the titanium salt to the orthotitanic acid and the crystalline titanium dioxide colloidal particles, while removing impurity ions from the aqueous titanium salt solution.

In an embodiment of the method of the present invention, before the at least one treatment selected from the treatments (a), (b) and (c), the aqueous solution of the titanium salt is heated at a temperature of 50° C. or more but less than 100° C.

In another embodiment of the method of the present invention, before the at least one treatment selected from the treatments (a), (b) and (c), the aqueous titanium salt solution is mixed with at least one member selected from the group consisting of alkali metal hydroxides and ammonia in an amount of less than 4 moles per mole of titanium present in the aqueous titanium salt solution, the resultant mixed aqueous solution is heated at a temperature of 50° C. or more but less than 100° C.

Also, the above-mentioned aqueous titanium dioxide ceramic paint can be produced by the method (2) of the present invention, which comprises the steps of:

mixing an aqueous solution of a titanium salt with at least one member selected from the group consisting of alkali metal hydroxides and ammonia in an amount of less than 4 moles per mole of titanium present in the aqueous titanium salt solution; and heating the resultant mixed aqueous solution at a temperature of 50° C. or more but less than 100° C., to thereby hydrolyze and convert at least a portion of the titanium salt to the orthotitanic acid and the crystalline titanium dioxide colloidal particles; and mixing the resultant titanium dioxide colloidal particle containing aqueous solution with at least one member selected from the group consisting of alkali metal hydroxides and ammonia to cause a precipitate to be formed;

collecting the resultant precipitate from the aqueous solution; and dispersing the collected precipitate in a dispersing medium consisting of a member selected from the group consisting of water, aqueous solutions of peroxide compounds and aqueous solutions of complexing agents for titanium.

DESCRIPTION OF THE PREFERRED EMBODIMENTS

The aqueous titanium dioxide ceramic paint of the present invention for forming a hydrophilic, photocatalytic and light-transmissible paint coating contains (A) at least one member selected from orthotitanic acid, titanium (IV) ions and peroxotitanic acid and (B) crystalline titanium dioxide colloidal particles having an average particle size of 0.001 to 0.2 µm (1 to 200 nm).

The orthotitanic acid usable for the present invention exhibits a high solubility in acid aqueous solutions and substantially no crystallizability and thus can be definitely distinguished from the crystalline titanium dioxide particles. Also, the titanium dioxide particles usable for the present invention include metatitanic acid, anatase titanium dioxide, and rutile titanium dioxide particles.

In the ceramic paint of the present invention, the orthotitanic acid can be prepared, as a precipitate, by adding at least one member selected from alkali metal hydroxides, for example, sodium hydroxide, and ammonia into an aqueous solution of at least one water-soluble titanium compound, for example, titanium tetrachloride, titanium sulfate, titanium oxychloride, or titanium oxysulfate. The resultant orthotitanic acid precipitate is collected by filtration and rinsed with water. The collected titanium acid can be employed as a material for the ceramic paint for the present invention.

The peroxotitanic acid usable for the ceramic paint of the present invention can be prepared in the state of an aqueous solution by adding an aqueous hydrogen peroxide solution to an aqueous solution of orthotitanic acid prepared by the above-mentioned procedures.

Further, the titanium (IV) ($Ti^{4+}$) ions usable for the ceramic paint of the present invention can be prepared and supplied by dissolving a water-soluble titanium salt in water. Particularly, the titanium (IV) ions can be stably exist in an acid aqueous solution having a pH value of 3 or less. Preferably, the titanium IV ions are in the form of an organic or inorganic complex.

The titanium dioxide ceramic paint of the present invention must comprise the crystalline titanium dioxide particles in addition to the orthotitanic acid, titanium (IV) ions and/or peroxotitanic acid. The crystal form of the titanium dioxide particles is most preferably anatase and second most preferably rutile.

The crystalline titanium dioxide particles must have an average particle size of from 0.001 to 0.2 µm, more preferably 0.002 to 0.1 µm, still more preferably 0.002 to 0.07 µm. If the average particle size is less than 0.001 µm, the resultant titanium dioxide paint coating is unsatisfactory in hydrophilicity and photocatalytic activity thereof. Also, if the average particle size is more than 0.2 µm, the resultant titanium dioxide paint coating exhibits insufficient hydrophilicity, light-transmittance and adhesion to a substrate surface. When the average particle size is in the range of from 0.002 to 0.1 µm, the resultant titanium dioxide ceramic paint coating can exhibit an excellent hydrophilicity.

In the titanium dioxide ceramic paint of the present invention, the weight ratio of the component (A) consisting of at least one member selected from orthotitanic acid, titanium (IV) ions and peroxotitanic acid to the component (B) consisting of the crystalline titanium dioxide particles having an average particle size of 0.001 to 0.2 µm, preferably 0.002 to 0.1 µm is in the range of from 1:0.1 to 1:200. If the weight ratio is less than 1:200, namely the content of the component (A) is too low and the content of the component (B) is too high, the resultant paint coating exhibits unsatisfactory hydrophilicity, adhesion to the substrate surface and light transmittance (transparency). Also, if the weight ratio is more than 1:0.1, namely the content of the component (B) is too small, the resultant paint coating exhibits an insufficient hydrophilicity and photocatalytic activity.

The titanium dioxide ceramic paint of the present invention can be prepared by mixing an aqueous solution of at least one member selected from orthotitanic acid, titanium (IV) ions and peroxotitanic acid with titanium dioxide particles or a titanium dioxide particle-containing sol, or by hydrolyzing and converting at least a portion of a titanium salt dissolved in water to orthotitanic acid and titanium dioxide particles and optionally converting at least a portion of the orthotitanic acid to peroxotitanic acid.

The aqueous solution of orthotitanic acid, titanium (IV) ions and peroxotitanic acid can be prepared by adding an alkaline aqueous solution into an aqueous solution of an orthotitanium salt to generate a precipitate of orthotitanic acid, collecting the orthotitanic acid precipitate, and dispersing the collected orthotitanic acid precipitate in an aqueous dispersing medium consisting of water, an aqueous solution of a peroxide compound and/or an aqueous solution of a complexing agent for titanium.

The orthotitanic acid and titanium dioxide particle-containing aqueous paint of the present invention can be prepared by the method of the present invention in which an aqueous solution of a titanium salt is subjected to a hydrolysis procedure in which at least a portion of the titanium salt is hydrolyzed and converted to the orthotitanic acid and the crystalline titanium dioxide colloidal particles, having an average particle size of 0.001 to 0.1 µm.

Also, the peroxotitanic acid and titanium dioxide particle-containing aqueous paint of the present invention can be prepared by adding a peroxide compound, for example, hydrogen peroxide, into the aqueous orthotitanic salt solution, before or after the hydrolysis procedures. In this case, the content of peroxotitanic acid in the resultant aqueous paint can be adjusted to 0 to 100% by controlling the amount of the peroxide compound to be added to the aqueous titanium salt solution. Namely, when no peroxide compound is added, the resultant aqueous paint contains orthotitanic acid and is free from peroxotitanic acid. Also, when the peroxide compound is added in an amount equimolar or more to the molar amount of the orthotitanic acid, the resultant aqueous paint contains peroxotitanic acid and is free from orthotitanic acid.

When the pH value of the reaction system is low, for example, 2 or less, a portion of orthotitanic acid is converted to titanium (IV) ions. In this case, to stabilize the resultant aqueous liquid, preferably a complexing agent is added to aqueous liquid to thereby convert the titanium (IV) ions to a titanium (IV) complex and to obtain a stabilized aqueous paint.

The complexing agent usable for forming the tetravalent titanium complex preferably comprises at least one member selected from lactic acid, oxalic acid, formic acid and acetylacetone. Also, gluconic acid, tartaric acid, acetic acid, malic acid, succinic acid and EDTA (ethylenediaminetetraacetic acid) may be employed as a complexing agent for titanium.

The titanium dioxide particles to be added to the aqueous solution of orthotitanic acid, titanium (IV) ions and/or peroxotitanic acid may be in the form of solid particles or of an aqueous sol. When the titanium dioxide in the form of solid particles is added, the resultant mixture is preferably fully agitated by using, for example, a homomixer, to uniformly disperse titanium dioxide particles and to prevent a formation of agglomerated particles. Also, a dispersing agent comprising, for example, a surface active agent may be added in a small amount to the dispersion system to promote the dispersion of the titanium dioxide particles.

In the methods for producing the aqueous titanium dioxide ceramic paint, the titanium salt usable as a starting material is preferably selected from titanium chloride, titanium sulfate, titanium oxysulfate and titanium oxychloride. Another water-soluble inorganic titanium salts and water soluble organic titanium salts, for example, titanium potassium oxalate and titanium citrate may be employed as a titanium salt for the methods of the present invention.

The aqueous titanium salt solution can be prepared by dissolving a titanium salt in water or may be selected from trade diluted aqueous titanium salt solutions.

When anhydrous titanium chloride is used as a standing material, an aqueous titanium chloride solution can be prepared by gradually dissolving anhydrous titanium chloride in pure water while cooling with ice. Also, when titanium trichloride is employed as a stating material, first, titanium (III) ions are oxidized into titanium (IV) ions with an oxidizing agent, for example, hydrogen peroxide, and second, the resultant titanium tetrachloride is subjected to the aqueous paint-producing procedures.

An aqueous titanium sulfate solution is available as a 30% aqueous solution on the market, and thus the trade aqueous solution can be utilized for the methods of the present invention, after properly diluting.

An aqueous solution of titanium oxysulfate or titanium oxychloride can be prepared by subjecting an aqueous solution of titanium sulfate or titanium chloride to an anion-removing treatment using, for example, an ion-exchange membrane or an ion-exchange resin, or by dissolving hydrated titanium oxide in sulfuric acid or hydrochloric acid.

In the method (1) of the present invention, the aqueous titanium salt solution is subjected to hydrolysis procedures for the titanium salt including (1) at least one treatment selected from:

(a) a dialysis treatment using a semipermeable membrane, (b) an electrodialysis treatment using a semipermeable membrane, and (c) an ion-exchange treatment using an ion-exchanger, and optionally, before the above-mentioned treatment, (2) a heating treatment at a temperature of from 50° C. or more but less than 100° C. for the aqueous titanium salt solution or (3) a combination of (i) an alkali treatment of mixing at least one member selected from alkali metal hydroxides and ammonia in an amount of less than 4 moles per mole of titanium present in the aqueous titanium salt solution, into the aqueous titanium salt solution, with (ii) a heating treatment at a temperature of 50° C. or more but less than 100° C. for the mixed aqueous solution, to thereby hydrolyze and convert at least a portion of the titanium salt to the orthotitanic acid and the crystalline titanium dioxide colloidal particles having an average particle size of 0.001 to 0.2 µm. During the treatment (a), (b) and/or (c), impurity ions are removed from the aqueous titanium salt solution.

The optional treatment (2) and (3) are contributory to promoting the hydrolysis of the titanium salt before the treatment (a), (b) and/or (c), and to enhancing the impurity ion-removement effect in the treatment (a), (b) and/or (c).

Also, in the method (2) of the present invention for producing the aqueous titanium dioxide ceramic paint, an aqueous solution of a titanium salt is mixed with at least one member selected from the group consisting of alkali metal hydroxides and ammonia in an amount of less than 4 moles per mole of titanium present in the aqueous titanium salt solution; and the resultant mixed aqueous solution is heated to a temperature of 50° C. or more but less than 100° C., to thereby hydrolyze and convert at least a portion of the titanium salt to the orthotitanic acid and the crystalline titanium dioxide colloidal particles; and then the resultant titanium dioxide colloidal particle-containing aqueous solution is mixed with at least one member selected from the group consisting of alkali metal hydroxides and ammonia to cause a precipitate to be formed and the resultant precipitate is collected from the aqueous solution, to thereby provide a precipitate substantially free from impurity ions, and finally the collected precipitate is dispersed in a dispersing medium consisting of a member selected from the group consisting of water, aqueous solutions of peroxide compounds and aqueous solutions of complexing agents for titanium.

In the methods (1) and (2) of the present invention, the aqueous titanium salt solution to be subjected to the hydrolysis procedures preferably has a concentration of titanium of 0.1 to 10% by weight, more preferably 0.5 to 4% by weight.

If the titanium concentration is less than 0.1% by weight, the resultant aqueous paint may not able to form a paint coating having a desired thickness. Also, if the titanium concentration is more than 10% by weight, the resultant aqueous titanium salt solution may be gelatinized during the impurity ion-removing treatment (a), (b) and/or (c) in the method (1).

In the method (1) of the present invention, each of the treatments (a), (b) and (c) is preferably carried out at a temperature of 0° C. to 80° C., more preferably 10° to 50° C. During these treatments, at least a portion of the titanium salt in the aqueous titanium salt solution is hydrolyzed and converted to orthotitanic acid and crystalline titanium dioxide particles.

When the titanium salt consists of titanium tetrachloride ($TiCl_4$), the hydrolysis of the titanium salt during the treatment (a), (b) and/or (c) is carried out in accordance with the following reactions.

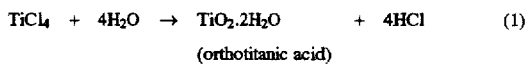

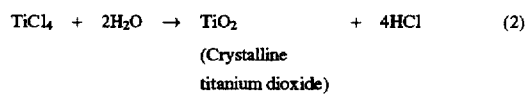

The by-product of the reactions (1) and (2) (namely HCl) is simultaneously removed together with impurity ions from the reaction mixture by the treatment (a), (b) and/or (c).

When the hydrolysis of the titanium salt is carried out during the treatment (a), (b) and/or (c) in accordance with the method of the present invention, the resultant orthotitanic acid is in a relatively high proportion and the resultant titanium dioxide particles have a very small particle size, and thus the resultant paint coating exhibits an enhanced mechanical strength.

Preferably, the aqueous titanium salt solution to be subjected to the method (1) of the present invention contains at least one member selected from titanium oxychloride and titanium oxysulfate.

In the method (1) of the present invention, the treatment (a) is a diffusion dialysis treatment using a semipermeable membrane and a diffusion medium consisting of water, preferably pure water. The semipermeable membrane usable for the treatment (a) may be selected from anion-exchange membranes, and membranes which allow both anionic ions and cationic ions to permeate therethrough, for example, RO membranes, cellophane (regenerated cellulose) membranes, bladder membranes, and collodion membranes. However, cation-exchange membranes hardly remove impurity ions such as $Cl^-$ and $SO_4^{2-}$ ions, and thus the semipermeable membrane consisting of the cation-exchange membrane alone is not preferred for the present invention. However, the cation-exchange membrane may be employed in combination with an anion-exchange membrane to form a semipermeable membrane.

The diffusion dialysis treatment (a) is carried out preferably for a time of one hours or more, more preferably, if possible, 3 hours or more.

The degree of the progress of the diffusion dialysis can be established by a pH value or electroconductivity of the dialysis liquid. Namely, the diffusion dialysis treatment (a) is continued preferably until the pH value of the dialysis liquid increases and reaches a level of 2 to 7, or until the electroconductivity of the dialysis liquid decreases and reaches a level of 1 mS/cm or less. However, the resultant aqueous paint is allowed to contain $Cl^-$ ions in an amount of about 1 g/liter or less to enhance the storage stability of the orthotitanic acid and titanium dioxide particles.

The treatment (b) usable for the method (1) of the present invention is an electrodialysis treatment using a semipermeable membrane, preferably an anion-exchange membrane. Compared with the diffusion dialysis treatment (a), the electrodialysis treatment (b) is advantageous in that the treatment can be completed within a relatively short time.

The electrodialysis using an anion-exchange membrane is carried out in an electrolysis vessel provided with an anode plate and a cathode plate placed in parallel to each other and partitioned through an anion-exchange membrane placed in parallel to the anode and cathode plates to form an anode chamber and cathode chamber. In the anode chamber, the aqueous titanium salt solution is placed and in the cathode chamber, water is contained.

The cathode plate is preferably a platinum plate, platinum-coated titanium plate, or DSE (insoluble cathode). The anode is preferably formed from a platinum-coated titanium plate or a stainless steel plate.

In the electrodialysis treatment (b), an electric current is applied preferably in a current density of 0.01 to 10 $A/dm^2$. If the current density is more than 10 $A/dm^2$, a problem that colloidal particles are adhered to the semipermeable membrane may occur. The anion-exchange membrane usable for the treatment (b) is preferably selected from strong basic anion-exchange membranes more preferably having a high resistance to acid.

In the method (1) of the present invention, the ion-exchange treatment (c) is preferably carried out by using an anion-exchanger, more preferably an anion-exchange resin. The anion-exchanger may be selected from zeolite, basis muscovite, hydrated iron oxide and hydrated zirconium oxide which have an anion-exchange activity.

In the ion-exchange treatment (c), the contact of the aqueous titanium salt solution with the ion-exchanger can be effected by directly mixing an ion-exchanger into the aqueous titanium salt solution or by passing the aqueous titanium salt solution through a column filled with an ion-exchanger.

The degree of progress of ion-exchange can be controlled by controlling the pH value or the electroconductivity of the resultant treat liquid to a predetermined increased value or a predetermined decreased value.

During the above-mentioned treatment (a), (b) and/or (c), at least a portion of the titanium salt in the aqueous solution thereof is hydrolyzed and converted to orthotitanic acid and titanium dioxide particles and simultaneously, the impurity ions present in the aqueous liquid are removed. Therefore, the resultant aqueous paint is substantially free from impurity ions, for example, $Cl^-$ and $SO_4^{2-}$ -anions and $Na^+$ cations.

If the removal of the impurity ions is carried out by a conventional method, for example, by filtering the aqueous paint through a microfilter or ultrafilter and then rinsing the filter with water, the orthotitanic acid, titanium (IV) ions and/or peroxotitanic acid are removed, together with the impurity ions, from the aqueous paint, and thus the resultant paint coating exhibits insufficient transparency (light-transmittance) and adhesion.

In an embodiment of the method (1) of the present invention, before the treatment (a), (b) and (c), an aqueous solution containing a titanium salt, for example, titanium chloride, titanium sulfate, titanium oxysulfate or titanium oxychloride is heated at a temperature of 50° C. or more but less than 100° C., preferably 60° to 90° C., to promote the hydrolysis of the titanium salt. The heating treatment is contributory to increasing the proportion of the resultant titanium dioxide particles and to controlling the particle size of the resultant titanium dioxide particles to a desired value. Namely, the heating treatment is contributory to enabling the resultant paint coating to exhibit a desired level of photocatalytic activity.

If the heating temperature is less than 50° C., the titanium dioxide particles having a desired particle size may be difficult to produce and thus the photocatalytic activity of the resultant paint coating may not reach a desired level. Also, if the heating temperature is 100° C. or more, the resultant aqueous paint may contain coarse titanium dioxide particles in an increased content, and thus may exhibit a low storage stability due to precipitation of the coarse titanium dioxide particles, and the resultant paint coat may exhibit an unsatisfactory light-transmittance.

The heating treatment is carried out preferably for a time of 3 to 240 minutes. If the heating treatment is carried out at a relatively low temperature, for example, 30° to 60° C., and the starting aqueous titanium salt solution has a relatively high pH value, for example, 3 to 7, the heating time may be more than 240 minutes.

Preferably, the heating treatment is carried out by uniformly heating, as a whole, the aqueous titanium salt solution contained in a reactor by using a hot water type heat-exchanger or a hot water bath, while uniformly agitating. A local heating of the aqueous titanium salt solution by, for example, an immersion heater should be avoided. Also, to control the formation and growth of the titanium dioxide particles in the heating treatment, a nucleator consisting of titanium dioxide particles for the titanium dioxide colloidal particles, or an aqueous dispersion of the nucleator is preferably added in a small amount into the aqueous titanium salt solution. After the heating treatment is completed, the resultant titanium dioxide particle containing liquid is cooled preferably to a temperature of 40° C. or less by a water-cooling means, and then subjected to the above-mentioned treatment (a), (b) and/or (c) in which the hydrolysis of the remaining titanium salt is further promoted, and simultaneously impurity anions, for example, $Cl^-$ and $SO_4^{2-}$ ions, and impurity cations, for example, $Na^+$ ions, other than ions consisting of titanium, oxygen and/or hydrogen, are removed.

In another embodiment of the method (1) of the present invention, an aqueous solution of a titanium salt is mixed with at least one member selected from the group consisting of alkali metal hydroxides and ammonia in an amount of less than 4 moles, preferably 0.1 mole or more but less than 4 moles, per mole of titanium present in the aqueous titanium salt solution, and the resultant mixed aqueous solution is heated at a temperature of 50° C. or more but less than 100° C., and then subjected to the treatments (a), (b) and/or (c).

More preferably, the total amount of the alkali metal hydroxide and/or ammonia is preferably 0.5 mole or more but less than 3 moles, per mole of titanium contained in the starting solution.

If the amount of the alkali metal hydroxide and/or ammonia is 4 moles or more per mole of titanium present in the starting solution, the resultant titanium dioxide particles may not able to grow to the desired particle size in the heating treatment and the treatment (a), (b) and/or (c). Also, if the amount of the alkali metal hydroxide and/or ammonia is less than 0.1 mole per mole of titanium, the heating treatment and the treatment (a), (b) and/or (c) may cause the titanium dioxide particle to grow to too large a particle size.

The alkali metal hydroxide and/or ammonia is preferably added in the state of a diluted aqueous solution with a concentration of 2 to 10% by weight, to the aqueous titanium salt solution.

Then, the alkali and/or ammonia-mixed solution is subjected to the same heating treatment as mentioned above. The mixed solution preferably has a titanium concentration of 0.1 to 10% by weight, more preferably 0.5 to 4% by weight. If the titanium concentration is less than 0.1% of weight, it may be difficult to obtain a paint coating having a thickness sufficient to exhibit desired properties. Also, if the titanium concentration is more than 10% by weight, the resultant liquid after the heating treatment may be gelatinized during the treatment (a), (b) and/or (c).

The heating treatment for the alkali and/or ammonia-mixed aqueous titanium salt solution is carried out under the same conditions as mentioned above, namely at a temperature of 50° C. or more but less than 100° C.

After the heating treatment is completed, the heated liquid is cooled preferably to a temperature of 40° C. or less, and then subjected to the treatment (a), (b) and (c). During the above-mentioned alkali and/or ammonia-mixing and heating treatments and the treatment (a), (b) and/or (c), at least a portion of the titanium salt is hydrolyzed and converted to orthotitanic acid and titanium dioxide particles, and during the treatment (a), (b) and (c), the impurity ions are removed from the aqueous liquid, to provide the titanium dioxide-containing aqueous ceramic paint.

The combination of the alkali and/or ammonia-mixing treatment and the heating treatment are advantageous in that the hydrolysis and conversion of the titanium salt to orthotitanic acid and titanium dioxide particle are promoted, and the resultant paint coating exhibit enhanced hydrophilicity, photocatalytic activity, and adhesion.

In the method (2) of the present invention, the aqueous titanium salt solution is subjected to the same combination of the alkali and/or ammonia-mixing treatment with the heating treatment as mentioned above, to hydrolyze and convert at least a portion of the titanium salt to orthotitanic acid and titanium dioxide particles having an average particle size of 0.001 to 0.2 µm. Then, the resultant aqueous solution containing the orthotitanic acid and the titanium dioxide particles is mixed with at least one member selected from alkali metal hydroxides and ammonia to cause a precipitate to be formed. The precipitate is collected from the solution and optionally rinsed with water. The collected precipitate is dispersed in an aqueous dispersing medium comprising at least one member selected from water, aqueous solutions of peroxide compounds and aqueous solutions of complexing agents for titanium.

By the collection and optional rinsing with water, the resultant precipitate is substantially free from impurity ions. Accordingly, in the method (2) of the present invention, the above-mentioned treatment (a), (b) and/or (c) can be omitted. The collection of the precipitate is effected by filtration or centrifugal separator.

In the dispersion of the collected precipitate, the peroxide compound is preferably selected from hydrogen peroxide, sodium peroxide, and barium peroxide. The peroxide compound react with at least a portion of orthotitanic acid and titanium (IV) ions to produce peroxotitanic acid. When hydrogen peroxide is used, the addition of hydrogen peroxide can be carried out before the collection of the precipitate. Also when sodium peroxide or barium peroxide is used, the resultant aqueous paint may be further subjected to the above-mentioned treatment (a), (b) and/or (c) to remove sodium ions or barium ions from the aqueous paint.

The complexing agent preferably comprises at least one member selected from lactic acid, oxalic acid, formic is acid, acetylacetone, gluconic acid, tartaric acid, acetic acid, malic acid, succinic acid, and EDTA.

The aqueous titanium dioxide ceramic paint produced by the method (1) or (2) of the present invention contains a large content of crystalline titanium dioxide particles in addition to orthotitanic acid, titanium (IV) ions and/or peroxotitanic acid. Usually, the titanium dioxide particles have an anatase crystal form. However, depending on the conditions of the heating treatment, the titanium dioxide particles may include rutile crystal particles.

Also, the titanium dioxide particles contained in the aqueous ceramic paint produced by the method (1) or (2) of the present invention have a particle size within the range of from $10^{-3}$ to $4 \times 10^{-1}$ mm and an average particle size of 0.001 to 0.2 µm, preferably 0.002 to 0.1 µm.

The aqueous paint produced by the method (1) or (2) of the present invention may be mixed with photocatalytic titanium dioxide particles or photocatalytic titanium colloidal particles or a sol.

Also, the aqueous titanium dioxide ceramic paint is optionally mixed with a coloring pigment to impart a desired color to the resultant paint coating, or with at least one member selected from based ceramic materials, for example, abrasion-resistant oxide, nitride and carbide compounds, to enhance wear resistance of the paint coating, or with fine metal particles, for example, fine zinc or aluminum particles to enhance corrosion resistance of the paint coating. Namely, the composition of the aqueous paint can be adjusted in consideration of the required properties of the resultant paint coating.

The aqueous titanium dioxide ceramic paint of the present invention is employed by coating the aqueous ceramic paint on a surface of a substrate article, drying the coated paint layer, and baking the dried paint layer at a temperature of, preferably 100° to 700° C., more preferably 200° to 500° C. Usually, the resultant baked paint coating contains anatase titanium dioxide crystals. When baked at a high temperature of 700° C. or more, however, at least a portion of the anatase crystals may be converted to rutile crystals. The crystal conversion does not cause the hydrophilicity of the paint coating to be reduced or be lost.

When the aqueous titanium dioxide ceramic paint is coated on a substrate surface and dried, the resultant ceramic paint coating usually has a thickness of 0.05 to 1 µm. In this dried paint coating, the crystalline titanium dioxide particles are uniformly distributed and colloidal or gelatinized orthotitanic acid or peroxotitanic acid packs or fills gap spaces between the distributed crystalline titanium dioxide particles. Even only by drying the paint coating at a relatively low temperature of 100° to 200° C., the colloidal or gelatinized orthotitanic acid and/or peroxotitanic acid is dehydrated and converted to hydrated titanium dioxide which has an increased surface area and a high water content, or titanium dioxide, so as to firmly bond the crystalline titanium dioxide particles to each other, to strongly adhere the paint coating to the substrate surface, to enhance the hydrophilicity of the paint coating and to prevent or reduce scattering of light on the particle surfaces. Also, the resultant paint coating is free from non-photocatalytic binder and thus can exhibit satisfactory photocatalytic activity, hydrophilicity and light-transmittance.

In the methods (1) and (2) of the present invention for producing the aqueous titanium dioxide ceramic paint, fine titanium dioxide particles having excellent hydrophilicity and photocatalytic activity are produced and grow to a desired optimum particle size, by hydrolyzing a titanium salt in an aqueous medium under specific conditions. In the methods (1) and (2) of the present invention, when the aqueous titanium salt solution is mixed with an alkali metal hydroxide and/or ammonium in an amount of less than 4 moles, preferably 0.1 mole or more but less than 4 moles per mole of titanium present in the starting aqueous titanium salt solution, crystal nucleus particles of hydrated titanium dioxide are generated.

If the titanium dioxide crystals excessively grow to form coarse particles, the alkaline ions are introduced into the coarse titanium dioxide crystals. The heating treatment is contributory to preventing the excessive growth of the crystals and thus the introduction of the alkaline ions into the crystals, and to enhancing the transparency and hydrophylicity of the resultant paint coating.

If the resultant aqueous titanium dioxide ceramic paint contains impurity ions, for example, $Cl^-$, $SO_4^{2-}$ and $Na^+$, the resultant paint coating formed by coating the aqueous paint on a substrate surface and drying the coated paint layer exhibits an unsatisfactory transparency and is an uneven white coating. Also, the resultant paint coating exhibits an insufficient photocatalytic activity. Therefore, this aqueous paint is unsuitable to coat a transparent article, for example, a glass article.

In the method (1) of the present invention, the impurity ions are removed from the aqueous paint by the specific treatment (a), (b) and/or (c), while hydrolyzing and converting at least a portion of the titanium salt to orthotitanic acid and crystalline titanium dioxide particles. Also, in the method (2) of the present invention, the aqueous liquid containing orthotitanic acid and crystalline titanium dioxide particles are mixed with an alkali metal hydroxide and/or ammonia to form a precipitate, the resultant precipitate is collected and optionally rinsed with water, and the collected precipitate, which is substantially free from impurity ions, is dispersed in an aqueous dispersing medium consisting of water, an aqueous peroxide compound solution and/or an aqueous complexing agent solution, to provide an aqueous crystalline titanium dioxide ceramic paint substantially free from impurity ions.

Since the aqueous titanium dioxide ceramic paint of the present invention is substantially free from the impurity ions, the resultant paint coating advantageously exhibits excellent transparency, adhesion, hydrophilicity and photocatalytic activity.

For an aluminum or copper article required to have a high hydrophilicity, for example, a fin material for heat exchanger, the aqueous titanium dioxide ceramic paint of the present invention can form a paint coating having excellent photocatalytic activity on the article, and can impart, to the article, enhanced antifouling, deodoring, anticorrosion, anti-bacteria and anti-alga activities. Also, the paint coating can prevent the degradation of hydrophilicity with the lapse of time, the generation of bad odor due to propagation of bacteria in water drops condensed on the article surface. Further, since the paint coating formed from the aqueous titanium dioxide ceramic paint of the present invention has a high transparency, the aqueous ceramic paint is useful for coating transparent articles, for example, glass articles and thus has a high practical utilizability.

EXAMPLES

The present invention will be further illustrated by the following examples.

Examples 1 to 4

In each of Examples 1 to 4, an aqueous paint was prepared by mixing an aqueous 10% sodium hydroxide solution to an aqueous 5% titanium tetrachloride solution to cause a precipitate to generate, collecting the precipitate consisting of orthotitanic acid by filteration, rinsing the collected precipitate with water, dispersing the precipitate in water, mixing the resultant orthotitanic acid-containing aqueous liquid with crystalline titanium dioxide particles, and then mixing the resultant liquid with the complexing agent in the amount as indicated in Table 1 in each of Examples 1, 3 and 4, and with the aqueous hydrogen peroxide solution in the amount sufficient to realize the concentration of peroxotitanic acid as shown in Table 1 in Example 2, and fully agitating the resultant mixture liquid by using a homomixer. The above-mentioned crystalline titanium dioxide particles were available under the trademark of titanium dioxide P-25 (anatase or rutile) made from Nihon Aerosil K.K. The above-mentioned complexing agent consisted of acetylacetone in Example 1, lactic acid in Example 3 and oxalic acid in Example 4.

Examples 5 and 6

In each of Examples 5 and 6, an aqueous paint was prepared as follows.

An aqueous 10% titanium tetrachloride solution was mixed with sodium hydroxide in an amount of 1 mole per mole of titanium present in the titanium tetrachloride solution, the mixed liquid was heated at a temperature of 90° C. for 40 minutes, the heated liquid was mixed with an aqueous 5% sodium hydroxide solution in such an amount that the resultant mixed liquid became neutral, to cause a precipitate to form, the resultant precipitate comprising orthotitanic acid and titanium dioxide was dispersed in water, the resultant aqueous dispersion was mixed with an aqueous hydrogen peroxide solution in such an amount that the resultant mixed liquid had the concentration of peroxotitanic acid as shown in Table 1, the resultant mixture liquid was fully agitated by using a homomixer. As aqueous titanium dioxide ceramic paint was obtained.

As a result of analysis, it was confirmed that the resultant aqueous paint contained anatase crystalline titanium dioxide particles having an average particle size of 0.08 μm.

Examples 7 and 8

In each of Examples 7 and 8, an aqueous paint was prepared as follows.

An aqueous 10% titanium tetrachloride solution was mixed with sodium hydroxide in an amount of 2 moles per mole of titanium present in the titanium tetrachloride solution, the mixed liquid was heated at a temperature of 75° C. for 20 minutes, the heated liquid was mixed with an aqueous 5% sodium hydroxide solution in such an amount that the resultant mixed liquid became neutral, to cause a precipitate to generate, the resultant precipitate comprising orthotitanic acid and titanium dioxide was dispersed in water, the resultant aqueous dispersion was mixed with, in Example 7, gluconic acid in the concentration shown in Table 1, and in Example 8, an aqueous hydrogen peroxide solution in such an amount that the resultant mixed liquid had the concentration of peroxotitanic acid as shown in Table 1, the resultant mixture liquid was fully agitated by using a homomixer. As aqueous titanium dioxide ceramic paint was obtained.

As a result of analysis, it was confirmed that the resultant aqueous paint contained anatase crystalline titanium dioxide colloidal particles having an average particle size of 0.05 μm.

Example 9

An aqueous titanium tetrachloride solution (20% by weight) was placed in a beaker and diluted with water. The diluted aqueous solution was heated at a temperature of 80° C. for 10 minutes and then cooled with water to a temperature of 30° C.

The resultant liquid was subjected to a diffusion dialysis using an anion-exchange membrane at a temperature of 27° C. while flowing deionized water through the membrane, to hydrolyze and convert a portion of titanium tetrachloride to orthotitanic acid and crystalline titanium dioxide particles, while removing impurity ions from the resultant aqueous paint.

Example 10

An aqueous titanium tetrachloride solution (20% by weight) was placed in a beaker and diluted with water and mixed with an aqueous solution of 10% by weight of sodium hydroxide in an amount of one mole per mol of titanium present in the aqueous titanium tetrachloride solution. The mixed liquid was heated at a temperature of 55° C. for 60 minutes and then cooled with water to a temperature of 30° C. The heated liquid was subjected to a diffusion dialysis using a cellophane membrane at a temperature of 25° C., while passing deionized water, through the membrane, to hydrolyze and convert at least a portion of titanium tetrachloride present in the starting aqueous solution to orthotitanic acid and crystalline titanium dioxide particles, while removing the impurity ions from the aqueous liquid.

The resultant titanium dioxide colloid-containing liquid was mixed with 0.5% by weight of lactic acid (complexing agent).

Example 11

An aqueous 20% by weight titanium trichloride solution was placed in a beaker and diluted with water. The diluted solution was mixed with an aqueous 31% hydrogen peroxide solution until violet-colored titanium (III) ions present in the aqueous solution were completely converted to colorless titanium (IV) ions. The resultant aqueous titanium tetrachloride solution was mixed with an aqueous solution of 10% by weight of sodium hydroxide in an amount of 2 moles per mole of titanium present in the aqueous solution. The mixed liquid was heated at a temperature of 70° C. for 30 minutes and then cooled with water to a temperature of 30° C. The resultant liquid was subjected to a diffusion dialysis treatment using an RO membrane at a temperature of 40° C. while passing deionized water through the membrane, to prepare an aqueous titanium dioxide ceramic paint substantially free from impurity ions.

Example 12

An aqueous 20% by weight titanium trichloride solution was placed in a beaker and diluted with water. The diluted solution was mixed with an aqueous 31% hydrogen peroxide solution until violet-colored titanium (III) ions present in the aqueous solution were completely converted to colorless titanium (IV) ions. The resultant aqueous titanium tetrachloride solution was mixed with an aqueous solution of 10% by weight of sodium hydroxide in an amount of 0.24 mole per mole of titanium present in the aqueous solution. The mixed liquid was heated at a temperature of 95° C. for 5 minutes and then cooled with water to a temperature of 30° C. The resultant liquid was subjected to a diffusion dialysis treatment using anion exchange and cation exchange membranes at a temperature of 30° C. while passing deionized water through the membrane, to prepare an aqueous titanium dioxide-containing liquid substantially free from impurity ions. The aqueous titanium dioxide-containing liquid was mixed with a complexing agent consisting of acetylacetone in an amount of 1.2% by weight.

Example 13

An aqueous 30% by weight titanium sulfate solution was placed in a beaker and diluted with water. The diluted solution was heated at a temperature of 65° C. for 90 minutes and then cooled with water to a temperature of 30° C.

The heat treated aqueous liquid was subjected to an electrodialysis treatment in an electrodialysis vessel having an anode chamber including an anode consisting of a platinum-plated titanium plate and a cathode chamber including an cathode consisting of a platinum-plated titanium plate, the anode and cathode chambers being partitioned from each other through an anion-exchange membrane (trademark: Selemion AMV, made by Asahi Garasu K.K.). The anode plate, the anion-exchange membrane and the cathode plate were arranged in this order and in parallel to each other, the anode chamber is charged with the heat treated titanium dioxide-containing aqueous liquid, and the cathode chamber was filled with water. The electrodialysis treatment was carried out at a current density of 1 to 5 A/dm$^2$ at a temperature of 45° C.

An aqueous titanium dioxide ceramic paint substantially free from impurity ions was obtained.

Example 14

An aqueous solution of 30% by weight of titanium sulfate was placed in a beaker and diluted with water. The diluted titanium sulfate solution was mixed with an aqueous solution of 2% by weight of sodium hydroxide in an amount of 1 mole per mole of titanium present in the titanium sulfate solution, heated to a temperature of 90° C. for 5 minutes, and cooled with water to a temperature of 30° C.

The heat-treated aqueous liquid was subjected to an electrodialysis treatment using an anion-exchange membranes (available under the trademark of Selemion AMW, from Asahi Garasu K.K.) and a cation-exchange membrane (available under the trademark of Selemion CMV, from Asahi Garasu K.K.) in an electrodialysis vessel which was partitioned through the anion-exchange membrane and the cation-exchange membrane into three chambers, namely an anode chamber including an anode consisting of a platinum-plated titanium plate and facing the anion-exchange membrane, a cathode chamber including a cathode consisting of a platinum-plated titanium plate and facing the cation-exchange membrane, and a central chamber formed between the anion-exchange membrane and the cation-exchange membrane. The anode plate, the anion-exchange membrane, the cation-exchange membrane and the cathode plates were arranged in the order as mentioned and in parallel to each other. The anode and cathode chambers were filled with water and the central chamber was filled with the heat-treated aqueous titanium dioxide-containing liquid.

The electrodialysis treatment was carried out at a current density of 0.2 to 0.6 A/dm$^2$ at a temperature of 30° C.

An aqueous titanium dioxide ceramic paint substantially free from impurity ions was obtained.

Example 15

An aqueous solution of 8% by weight of titanium oxysulfate was placed in a beaker and diluted with water, then heated at a temperature of 60° C. for 180 minutes, and cooled with water to a temperature of 30° C.

The heat treated aqueous liquid was passed through a column packed with a mixture of anion-exchange resin heads (available under the trademark of Diaion SA, from Mitsubishi Kaseilkogyo K.K.) and cation-exchange resin heads (available under the trademark of Diaion SK, from Mitsubishi Kaseikogyo K.K.), at a temperature of 30° C.

An aqueous titanium dioxide ceramic paint substantially free from impurity ions was obtained.

Example 16

An aqueous solution of 15% by weight of titanium oxysulfate was placed in a beaker and diluted with water, then heated to a temperature of 80° C. for 8 minutes, and cooled with water to a temperature of 30° C.

The heat treated aqueous liquid was passed through a column packed with anion-exchange resin heads (available under the trademark of Diaion SA, from Mitsubishi Kaseikogyo K.K.) at a temperature of 50° C.

An aqueous titanium dioxide ceramic paint substantially free from impurity ions was obtained.

Example 17

An aqueous solution of 10% by weight of titanium oxychloride was placed in a beaker and diluted with water, then heated at a temperature of 85° C. for 10 minutes, and cooled with water to a temperature of 30° C.

The heat treated aqueous liquid was passed through the same ion-exchange resin-packed column as in Example 16 at a temperature of 40° C.

An aqueous titanium dioxide ceramic paint substantially free from impurity ions was obtained.

Example 18

An aqueous solution of 20% by weight of titanium tetrachloride was diluted with water in a beaker. The diluted aqueous solution was subjected to a diffusion dialysis treatment using an anion-exchange membrane (trademark: Selemion DMV, made by Asahi Garasu K.K.) at room temperature (20° to 30° C.), while passing deionized water through the membrane, until the concentration of acid in the aqueous liquid decreased to 1/10 or less of the original acid concentration, before the dialysis. The acid concentration was measured by a neutralizing titration method using a 0.1 N sodium hydroxide (NaOH) standard solution and bromphenol blue indicator.

An aqueous titanium dioxide ceramic paint substantially free from impurity ions was obtained.

Example 19

An aqueous solution of 30% by weight of titanium sulfate was diluted with water in a beaker.

The diluted aqueous solution was subjected to a diffusion dialysis treatment using an anion-exchange membrane (trademark: Selemion DMV), while flowing deionized water through the membrane and cooling the dialysis system to a temperature of 1° to 10° C., until the acid concentration of the aqueous liquid decreased to 1/10 or less of the original acid concentration thereof before the dialysis. The acid concentration was measured by the same method as in Example 18.

An aqueous titanium dioxide ceramic paint substantially free from impurity ions was obtained.

Example 20

An aqueous solution of 20% by weight of titanium tetrachloride was placed in a beaker and diluted with water, while agitating the aqueous solution, anion-exchange resin heads (trademark: Diaion SA, made by Mitsubishi Kaseikogyo K.K.) were mixed into the aqueous solution at a temperature of 20° to 30° C., until the acid concentration of the aqueous solution decreased to 1/10 or less of the original acid concentration before the ion-exchange resin treatment.

The acid concentration was determined by the same method as in Example 18.

An aqueous titanium dioxide ceramic paint substantially free from impurity ions was obtained.

Comparative Examples 1 to 3

In each of Comparative Examples 1 to 3, an aqueous titanium dioxide ceramic paint was prepared by mixing an aqueous solution of 5% by weight of titanium tetrachloride with an aqueous solution of 10% by weight of sodium hydroxide to generate a precipitate, the precipitate was collected and rinsed with water, the resultant orthotitanic acid precipitate was dispersed in water, the resultant aqueous orthotitanic acid solution was mixed with titanium dioxide particles and then with an aqueous hydrogen peroxide solution in such an amount that the resultant solution contained peroxotitanic acid in the concentration as shown in Table 1, and the resultant mixture was fully agitated. The mixed titanium dioxide particles were, in Comparative Example 1, rutile type titanium dioxide pigment particles having an average particle size of 0.5 μm, in Comparative Example 2, titanium dioxide pigment particles (anatase or rutile) (trademark: P-25, made by Nihon Aerosil K.K.) and in Comparative Example 3, anatase type titanium dioxide colloidal particles having an average particle size of 0.01 μm and in the form of an aqueous colloidal solution, prepared by heating an aqueous solution of 8% by weight of titanium oxychloride at a temperature of 75° C. for 20 minutes, and subjected to the heated solution to a diffusion dialysis treatment using an ion-exchange membrane.

Comparative Example 4

An aqueous solution of 17% by weight of titanium tetrachloride was placed in a beaker, diluted with water, and heated at a temperature of 100° C. for 15 minutes, and cooled to room temperature.

The heat treat aqueous liquid was subjected to a diffusion dialysis treatment using a cellophane membrane.

Comparative Example 5

An aqueous solution of 30% by weight of titanium sulfate was placed in a beaker, diluted with water. Then, while agitating and cooling with water, the diluted aqueous solution was mixed an aqueous solution of 10% by weight of sodium hydroxide in an amount of 4.5 moles per mole of titanium present in the aqueous solution, and heated at a temperature of 70° C. for 15 minutes. After cooling, the resultant aqueous liquid was subjected to the same diffusion dialysis treatment as in Comparative Example 4.

Comparative Example 6

An aqueous solution of 5% by weight of titanium oxychloride was placed in a beaker, heated at a temperature of 40° C. for 30 minutes and cooled to room temperature. The heat-treated aqueous solution was subjected to the same electrodialysis treatment as in Examples 13 to 15, using an ion-exchange membrane.

Tests

The aqueous titanium dioxide ceramic paints of the examples and comparative examples ware subjected to the following analysis and measurements.

(1) Concentration of titanium dioxide in aqueous paint

A sample of an aqueous paint in an amount of 20 ml was placed in a glass beaker and dried in a drying oven at a temperature of 80° C. to evaporate water from the sample, then heated at a temperature of 500° C. for 2 hours to provide a solid titanium dioxide. The concentration of titanium dioxide present in the sample was determined from the original weight of the sample and the weight of the solid titanium dioxide.

When the sample contained orthotitanic acid, titanium (IV) ions and/or peroxotitanic acid, the total amount determined in the manner as mentioned below was converted to a weight in terms of titanium dioxide, and the converted weight was subtracted from the weight of the solid titanium dioxide. The subtraction result was a real weight of titanium dioxide particles present in the aqueous paint.

(2) Concentration of peroxotitanic acid in aqueous paint

A sample of an aqueous paint was diluted with water, and filtered through a 5 C filter paper sheet. The resultant filtrate was mixed with hydrochloric acid to acidify the filtrate. The acidified filtrate was subjected to a measurement of absorbance at a wavelength of 430 nm by using a spectrophotometer. From the resultant absorbance value, the concentration of peroxotitanic acid present in the sample was determined.

(3) Total concentration of orthotitanic acid and titanium (IV) ions in aqueous paint A sample of an aqueous paint was filtered through a 5 C filter paper sheet, the resultant filtrate was acidified with hydrochloric acid and then mixed with hydrogen peroxide to convert orthotitanic acid and titanium (IV) ions to peroxotitanic acid. The absorbance of the resultant modified filtrate was measured at a wavelength of 430 nm by the same method as mentioned above. From the measurement result, the total concentration of orthotitanic acid and titanium (IV) ions in the sample was determined. When the sample contained peroxotitanic acid, the concentration of the peroxotitanic acid in the sample was determined by the method mentioned in the above item (2), and resultant peroxotitanic acid concentration is subtracted from the total concentration of orthotitanic acid and/or titanium (IV) ions and peroxotitanic acid tetermined above.

(4) Tests of paint coating

Each aqueous paint was coated on a surface area of 75 mm×25 mm of a glass plate or aluminum plate (JIS A1200), to form a paint layer having a thickness of about 0.5 μm. The paint layer was dried at a temperature of 100° C. and baked at a temperature of 280° C. to form a dry paint coating. The resultant specimen with the dry paint coating was subjected to the following tests for hydrophilicity, corrosion resistance, transparency, adhesion and photocatalytic activity.

(a) Hydrophilicity of paint coating

On each of the baked paint coatings of the specimens, pure water in an amount of 5 ml was placed dropwise, and the contact angle of the formed water droplet was measured by using a FACE contact angle tester (model: CA-P, made by Kyowa Kaimenkagaku K.K.).

The above measurement was applied to the paint coating of the specimens immediate after the baking step was applied and after five cycles of treatments each consisting of an immersion procedure of the specimen in flowing water at room temperature for 8 hours and then a drying procedure of the water-immersed specimen at a temperature of 80° C. for 16 hours, were applied. The hydrophilicity of the paint coating was evaluated as follows.

| Class of hydrophilicity | Contact angle |
| --- | --- |
| 4 | Less than 10 degrees |
| 3 | 10 degrees or more but less than 20 degrees |

| Class of hydrophilicity | Contact angle |
|---|---|
| 2 | 20 degrees or more but less than 30 degrees |
| 1 | 30 degrees or more |

(b) Corrosion resistance of paint coating

Each of the aqueous paints was coated on a surface of an aluminum plate, and the resultant specimen was subjected to a salt water-spray test in accordance with Japanese Industrial Standard (JIS) Z 2371, for 200 hours. A proportion of the total area of corroded portions of the paint coating based on the entire area of the paint coating was measured and evaluated as follows.

| Class of corrosion resistance | Total area of corroded portions |
|---|---|
| 3 | Less than 5% |
| 2 | 5% or more but less than 25% |
| 1 | 25% or more |

(c) Transparency of paint coating

Each of the baked paint coating formed on the glass plate was observed by the naked eye and the observation result was evaluated as follows.

| Class of transparency | Observation result |
|---|---|
| 4 | The paint coating has no blur and discoloration and is uniformly transparent |
| 3 | The paint coating has a slight discoloration and is uniformly transparent |
| 2 | The paint coating has certain discoloration |
| 1 | The paint coating has certain blur and is opaque |

(d) Adhesion of paint coating

An adhesive tape was adhered to a surface of a paint coating to be tested and peeled out from the paint coating surface. It was determined if the paint coating was removed from the substrate surface.

(e) Photocatalytic activity of paint coating

A paint coating was formed on a 25 mm×75 mm area surface of a glass plate. A test oil consisting of tristearic acid was coated on the paint coating surface, and ultraviolet rays were irradiated from a 15 W ultraviolet lamp to the test oil layer for 72 hours. The amount ($mg/m^2$) of decomposed test oil was determined from a difference in weight between the original test oil layer and the decomposed test oil layer.

Table 1 shows the test results of Examples 1 to 8 and Comparative Examples 1 to 3.

Table 2 shows the test results of examples 9 to 17 and Comparative Examples 4 to 6.

Table 3 shows the test results of Examples 18 to 20.

TABLE 1

Examples 1 to 8 and Comparative Examples 1 to 3

| | Composition of aqueous titanium dioxide ceramic pain | | | | | Performances of paint coating | | | | | |
|---|---|---|---|---|---|---|---|---|---|---|---|
| | Titanium dioxide particles | | Total content of ortho- | Content of | Content | Hydrophilicity | | corro- | | | Photo- |
| Item Example No. | Average particle size (μm) | Content (wt %) | titanic acid and $Ti^{4+}$ ions (wt %) | peroxo- titanic acid (wt %) | of Com- plexing agent (wt %) | Initial | After 5 cycles of treatments | sion resis- tance | Adhe- sion | Trans- parency | catalytic activity ($g/m^2$) |
| Example | | | | | | | | | | | |
| 1 | 0.04 | 2.0 | 0.5 | — | 0.5 | 4 | 4 | 3 | Good | 4 | 0.61 |
| 2 | 0.04 | 1.0 | 0.1 | 0.1 | — | 4 | 4 | 3 | Good | 4 | 0.60 |
| 3 | 0.04 | 3.2 | 0.2 | — | 0.1 | 4 | 4 | 3 | Good | 4 | 0.59 |
| 4 | 0.04 | 0.5 | — | 2.0 | 0.2 | 4 | 4 | 3 | Good | 4 | 0.61 |
| 5 | 0.08 | 6.0 | 0.04 | — | — | 4 | 4 | 3 | Good | 3 | 0.60 |
| 6 | 0.08 | 4.0 | — | 1.0 | | 4 | 4 | 3 | Good | 3 | 0.58 |
| 7 | 0.005 | 3.0 | 0.1 | — | 0.2 | 4 | 4 | 3 | Good | 4 | 0.57 |
| 8 | 0.005 | 0.5 | 1.0 | 3.0 | — | 4 | 4 | 3 | Good | 4 | 0.59 |
| Comparative Example | | | | | | | | | | | |
| 1 | 0.50 | 2.0 | 0.3 | 0.1 | — | 3 | 1 | 2 | Bad | 1 | 0.55 |
| 2 | 0.02 | 3.0 | 0.01 | — | — | 3 | 1 | 2 | Bad | 1 | 0.28 |
| 3 | 0.01 | 0.1 | 3.0 | 2.0 | — | 3 | 2 | 2 | Good | 2 | 0.20 |

TABLE 2

Examples 9 to 17 and Comparative Examples 4 to 6

| Example No. | Composition of titanium compound solution fed to heating treatment | | | Heating treatment temperature (°C.) × time (min) |
|---|---|---|---|---|
| | Starting titanium salt | Content of titanium (mole/l) | Amount of NaOH or NH$_3$ (mole/l) | |
| Example | | | | |
| 9 | Titanium tetrachloride | 0.5 | — | 80° C. × 10 min. |
| 10 | Titanium tetrachloride | 1.0 | 1.0 | 55° C. × 60 min. |
| 11 | Titanium trichloride | 0.2 | 0.4 | 70° C. × 30 min. |
| 12 | Titanium trichloride | 2.5 | 0.6 | 95° C. × 3 min. |
| 13 | Titanium sulfate | 0.8 | — | 65° C. × 90 min. |
| 14 | Titanium sulfate | 0.1 | 0.05 | 90° C. × 5 min. |
| 15 | Titanium oxysulfate | 0.4 | — | 60° C. × 180 min. |
| 16 | Titanium oxysulfate | 0.7 | — | 80° C. × 8 min. |
| 17 | Titanium oxychloride | 0.5 | — | 85° C. × 10 min. |
| Comparative Example | | | | |
| 4 | Titanium tetrachloride | 0.5 | — | 00° C. × 15 min. |
| 5 | Titanium sulfate | 1.0 | 4.5 | 70° C. × 15 min. |
| 6 | Titanium oxychloride | 1.0 | — | 40° C. × 70 min. |

| Example No. | Composition of aqueous paint | | | Performances of paint coating | | | | | |
|---|---|---|---|---|---|---|---|---|---|
| | Titanium dioxide particles | | Total content of orthotitanic acid and Ti(IV) ions (wt %) | Hydrophilicity | | corrosion resistance | Adhesion | Transparency | Photocatalytic activity (g/m$^2$) |
| | Average particle size (μm) | Content (wt %) | | Initial | After 5 cycles of treatments | | | | |
| Example | | | | | | | | | |
| 9 | 0.05 | 3.6 | 0.4 | 4 | 4 | 3 | Good | 3 | 0.65 |
| 10 | 0.03 | 6.0 | 1.8 | 4 | 4 | 3 | Good | 4 | 0.55 |
| 11 | 0.03 | 1.4 | 0.2 | 4 | 4 | 3 | Good | 4 | 0.54 |
| 12 | 0.15 | 15.0 | 0.1 | 4 | 4 | 3 | Good | 4 | 0.61 |
| 13 | 0.10 | 6.0 | 0.2 | 4 | 4 | 3 | Good | 3 | 0.56 |
| 14 | 0.04 | 0.3 | 0.5 | 4 | 4 | 3 | Good | 4 | 0.54 |
| 15 | 0.03 | 0.4 | 2.8 | 4 | 4 | 3 | Good | 3 | 0.58 |
| 16 | 0.06 | 4.9 | 0.5 | 4 | 4 | 3 | Good | 3 | 0.50 |
| 17 | 0.08 | 3.5 | 0.5 | 4 | 3 | 3 | Good | 3 | 0.60 |
| Comparative Example | | | | | | | | | |
| 4 | 0.35 | 3.3 | 0.5 | 4 | 2 | 2 | Bad | 1 | 0.52 |
| 5 | 0.07 | 0.3 | 7.3 | 3 | 2 | 2 | Bad | 2 | 0.28 |
| 6 | 0.00 | 0.1 | 7.7 | 2 | 1 | 2 | Bad | 3 | 0.16 |

TABLE 3

Examples 18 to 20

| | Composition of aqueous titanium dioxide ceramic paint | | | Performances of paint coating | | | | | |
|---|---|---|---|---|---|---|---|---|---|
| | Titanium dioxide particles | | Content of ortho- titanic acid (wt %) | Hydrophilicity | | Corro- sion resis- tance | Adhe- sion | Trans- parency | Photo- catalytic activity (g/m$^2$) |
| Item Example No. | Average particle size (μm) | Content (wt %) | | Initial | After 5 cycles of treatments | | | | |
| Example | | | | | | | | | |
| 18 | 0.005 | 4.2 | 0.6 | 4 | 4 | 3 | Good | 4 | 0.56 |
| 19 | 0.002 | 3.6 | 1.2 | 4 | 4 | 3 | Good | 4 | 0.48 |
| 20 | 0.003 | 1.8 | 3.2 | 4 | 4 | 3 | Good | 4 | 0.51 |

Tables 1 to 3 clearly show that the aqueous titanium dioxide ceramic paints of Examples 1 to 20 in accordance with the present invention could form paint coatings having excellent hydrophilicity, corrosion resistance, adhesion, transparency and photocatalytic activity. However, the aquatic paints of Comparative Examples 1 to 6 were unsatisfactory in one or more of the above-mentioned properties.

As Examples 1 to 20 clearly show, the aqueous titanium dioxide ceramic paints of the present invention are useful for forming a paint coating having satisfactory transparency, corrosion resistance, adhesion and excellent hydrophilicity and photocatalytic activity.

Also, the methods of the present invention for producing the aqueous titanium dioxide ceramic paint are industrially advantageous, compared with conventional methods, for example, the sol-gel method, in that the starting materials and chemicals are cheap and the resultant aqueous paint exhibits enhanced safety and stability. Accordingly, the aqueous titanium dioxide ceramic paints produced by the methods (1) and (2) of the present invention are very useful for stain-proofing, promoting decomposition of odor-generating materials, antimicrobiological treatment, corrosion prevention, purification of air and water, etc. and thus has a high industrial utilizability.

What we claimed is:

1. An aqueous titanium dioxide ceramic paint for forming a paint coating having excellent hydrophilicity, photocatalytic activity and light-transmittance, comprising:

(A) at least one member selected from the group consisting of orthotitanic acid, titanium (IV) ions and peroxotitanic acid, and (B) crystalline titanium dioxide colloidal particles having an average particle size of 0.001 to 0.2 μm.

the weight ratio, in terms of titanium, of the component (A) to the component (B) being from 1:0.1 to 1:200, and the ceramic paint being substantially free from impurity ions.

2. The aqueous titanium dioxide ceramic paint as claimed in claim 1, wherein the average particle size of the crystalline titanium dioxide particles is from 0.002 to 0.1 μm.

3. A method of producing the aqueous titanium dioxide ceramic paint as claimed in claim 1, comprising subjecting an aqueous solution of a titanium salt to at least one treatment selected from the group consisting of:

(a) a dialysis treatment using a semipermeable membrane, (b) an electrodialysis treatment using a semipermeable membrane, and (c) an ion-exchange treatment using an ion-exchanger to thereby hydrolyze and convert at least a portion of the titanium salt to be orthotitanic acid and the crystalline titanium dioxide colloidal particles, while removing impurity ions from the aqueous titanium salt solution.

4. The method as claimed in claim 3, wherein the treatments (a), (b) and (c) are carried out at a temperature of 0° to 80° C.

5. A method as claimed in claim 4, wherein the aqueous solution of the titanium salt is heated at a temperature of 50° C. or more but less than 100° C., and then, subjected to the at least one treatment selected from the treatments (a), (b) and (c).

6. The method as claimed in claim 3 or 5, wherein the aqueous titanium salt solution is an aqueous solution containing at least one member selected from the group consisting of titanium oxychloride and titanium oxysulfate.

7. The method as claimed in claim 3, wherein the aqueous titanium salt solution is mixed with at least one member selected from the group consisting of alkali metal hydroxides and ammonia in an amount of less than 4 moles per mole of titanium present in the aqueous titanium salt solution, and the resultant mixed aqueous solution is heated at a temperature of 50° C. or more but less than 100° C., and then subjected to the at least one treatment selected from the treatments (a), (b) and (c).

8. A method of producing the titanium dioxide ceramic paint as claimed in claim 1, comprising the steps of:

mixing an aqueous solution of a titanium salt with at least one member selected from the group consisting of alkali metal hydroxides and ammonia in an amount of less than 4 moles per mole of titanium present in the aqueous titanium salt solution; and heating the resultant mixed aqueous solution at a temperature of 50° C. or more but less than 100° C., to thereby hydrolyze and convert at least a portion of the titanium salt to the orthotitanic acid and the crystalline titanium dioxide colloidal particles; and mixing the resultant titanium dioxide colloidal particle-containing aqueous solution with at least one member selected from the group consisting of alkali metal hydroxides and ammonia to cause a precipitate to be formed;

collecting the resultant precipitate from the aqueous solution; and dispersing the collected precipitate in a dispersing medium consisting of a member selected from the group consisting of water, aqueous solutions of peroxide compounds and aqueous solutions of complexing agents for titanium.

* * * * *